United States Patent
Khasnis et al.

(10) Patent No.: US 10,164,422 B2
(45) Date of Patent: Dec. 25, 2018

(54) PROTECTION CIRCUIT FOR LOW VOLTAGE DEVICES DRIVEN BY A HIGH VOLTAGE CIRCUIT

(71) Applicant: SIGNALCHIP INNOVATIONS PRIVATE LIMITED, Bangalore (IN)

(72) Inventors: Himamshu Gopalakrishna Khasnis, Bangalore (IN); Nikhil Birur Gururaja Rao, Bangalore (IN)

(73) Assignee: SIGNALCHIP INNOVATIONS PRIVATE LIMITED (IN)

( * ) Notice: Subject to any disclaimer, the term of this patent is extended or adjusted under 35 U.S.C. 154(b) by 382 days.

(21) Appl. No.: 15/169,148

(22) Filed: May 31, 2016

(65) Prior Publication Data

US 2016/0359315 A1  Dec. 8, 2016

(30) Foreign Application Priority Data

Jun. 2, 2015 (IN) ............. 2767/CHE/2015

(51) Int. Cl.
*H02H 3/20* (2006.01)
*H02H 1/00* (2006.01)

(52) U.S. Cl.
CPC ............ *H02H 3/20* (2013.01); *H02H 1/0007* (2013.01)

(58) Field of Classification Search
USPC ................... 361/18, 90; 307/64, 75, 80, 112
See application file for complete search history.

(56) References Cited

U.S. PATENT DOCUMENTS

| | | | | |
|---|---|---|---|---|
| 2007/0103829 A1* | 5/2007 | Darshan | ................ | H04L 12/10 361/90 |
| 2008/0054722 A1* | 3/2008 | Phelps | ................... | H02J 9/061 307/64 |
| 2014/0132074 A1* | 5/2014 | Bush | ...................... | H02J 9/06 307/66 |
| 2014/0265604 A1* | 9/2014 | Mergener | ............ | H02J 7/0063 307/80 |
| 2014/0306717 A1* | 10/2014 | Feenstra | ............... | G01R 31/08 324/543 |
| 2015/0008744 A1* | 1/2015 | Navarro | ................. | H02J 9/061 307/64 |
| 2015/0009598 A1* | 1/2015 | Trombetti | ............ | G01R 31/08 361/86 |
| 2015/0103456 A1* | 4/2015 | Ghisla | ..................... | H02H 3/38 361/79 |
| 2015/0180279 A1* | 6/2015 | Nielsen | ................ | H02M 7/487 307/64 |

(Continued)

*Primary Examiner* — Ronald W Leja (74) *Attorney, Agent, or Firm* — Stetina Brunda Garred & Brucker (57) ABSTRACT

A method and system for protecting low voltage devices driven by a high voltage circuit is disclosed. The method comprises monitoring an output voltage, from a high voltage block, to a low voltage block. The method further comprises comparing the output voltage with a range of voltages allowable for driving the low voltage block. The range of voltages may be pre-defined or dynamically determined. Furthermore, the method comprises operating a first set of switches and a second set of switches. The first set of switches are operated to feed voltage from the high voltage block to input of the low voltage block, and the second set of switches are operated to feed a plurality of reference voltages to the input of the low voltage block.

18 Claims, 7 Drawing Sheets

(56) References Cited

U.S. PATENT DOCUMENTS

2016/0072322 A1* 3/2016 Yoshimatsu .......... H02J 7/0086
320/164
2016/0359315 A1* 12/2016 Khasnis ................. H02H 3/20

* cited by examiner

PROTECTION CIRCUIT FOR LOW VOLTAGE DEVICES DRIVEN BY A HIGH VOLTAGE CIRCUIT

PRIORITY CLAIM

The present application claims priority to a provisional application, 2767/CHE/2015, filed on Jun. 2, 2015, entirely of which is attached herewith.

FIELD OF THE INVENTION

The present disclosure relates to a circuit for protecting a low voltage block when driven by a voltage higher than the safe operating voltage.

BACKGROUND

Nowadays, 3G or 4G networks are widely used to support high bandwidths of communication in electronic devices. However, power consumption of the electronic device increases with increase in the bandwidth. As known, the electronic device comprises a plurality of blocks. In order to comply with various specifications related to 3G & 4G standards, the complexity in arranging the plurality of blocks increases.

In electronic devices, such as mobile phones, tablets, laptops, low power consumption is desirable. In order to reduce the power consumption, each block in the electronic device is to be utilized to its fullest capacity. A variety of design techniques such as mixing blocks running on different power supply voltages, sub-threshold design, aggressive power management and various power down modes are used to overcome the difficulty in design and to reduce power consumption.

When the various blocks are running on different power supply voltages, a low voltage block can be driven by a block running on a high voltage power supply to achieve maximum input swing. The power supply voltage of the block driving the low voltage block is higher than the maximum voltage that the low voltage device can sustain without damage. In the example of a mixer, a MOSFET is used as a switch. A switch needs to have low resistance for the maximum transfer of the signal. The resistance of a MOSFET can be reduced by reducing the length. So a low voltage device is used as it can be made to have smaller length. However, the block driving the low voltage device may experience uncontrolled electrical transients, which forces the output of the block to reach as high as the power supply voltage. Further, the block driving the low voltage device may also experience controlled transients, which forces the output voltage to be greater than the maximum safe operating voltage of the low voltage device. The electrical transients generated may damage the low voltage device.

In order to protect the low voltage device, protective devices can be effectively switched into a circuit in response to a transient overvoltage, and subsequently switched out within a reasonably short period to resume normal circuit operation. In prior art, a mixer is arranged to provide a mixed signal by mixing an input signal and an oscillation signal. Usually, the control signal of the mixer switch is the oscillator signal varying over a bias voltage. The input signal is used to bootstrap the oscillator signal. Therefore, the control signal is the oscillator signal varying over the input signal. However, the mixer does not provide protection to the electronic devices during power ON and power OFF and other uncontrolled transients. Further, complexity of the circuitry in the prior art adds additional load to the high frequency clocks.

SUMMARY

The problems in the existing and/or typical systems are met by providing a protection circuit for low voltage devices driven by a high voltage circuit.

An example of a method for protecting low voltage devices driven by a high voltage block, comprises monitoring an output voltage, from a high voltage block to a low voltage block. The method further comprises comparing the output voltage with a range of voltage allowable for driving the low voltage block. Furthermore, the method comprises operating a first set of switches and a second set of switches. The first set of switches are operated when the output voltage is within the range to feed voltage from the high voltage block to input of the low voltage block and the second set of switches are operated when the output voltage is not within the range to feed a plurality of reference voltages to the input of the low voltage block. Further, the range may be pre-defined or dynamically determined. Further, the low voltage block is operated in Radio Frequency (RF) domain and the high voltage block is operated in baseband domain.

An example of a system for protecting low voltage devices driven by a high voltage block comprises a voltage comparator. The voltage comparator monitors an output voltage, from a high voltage block to a low voltage block and compares the output voltage with a range of voltage allowable for driving the low voltage block. The system further comprises a circuit to operate a first set of switches and a second set of switches. The first set of switches are operated when the output voltage is within the range to feed voltage from the high voltage block to input of the low voltage block, and the second set of switches are operated when the output voltage is not within the range to feed a plurality of reference voltages to the input of the low voltage block.

BRIEF DESCRIPTION OF FIGURES

In the following drawings like reference numbers are used to refer to like elements. Although the following figures depict various examples of the disclosure, the disclosure is not limited to the examples depicted in the figures.

DETAILED DESCRIPTION

In the present disclosure, relational terms such as first and second, and the like, may be used to distinguish one entity from the other, without necessarily implying any actual relationship or order between such entities. The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure describes a protection circuit to protect a low voltage block when driven by a high voltage block. The high voltage block running on a high voltage power supply is used to drive a mixer which contains low voltage devices to obtain maximum swing at the output of the mixer. The protection circuit prevents damage caused to the mixer from the high voltage block by clipping the voltage exceeding a threshold voltage.

Figure 1:
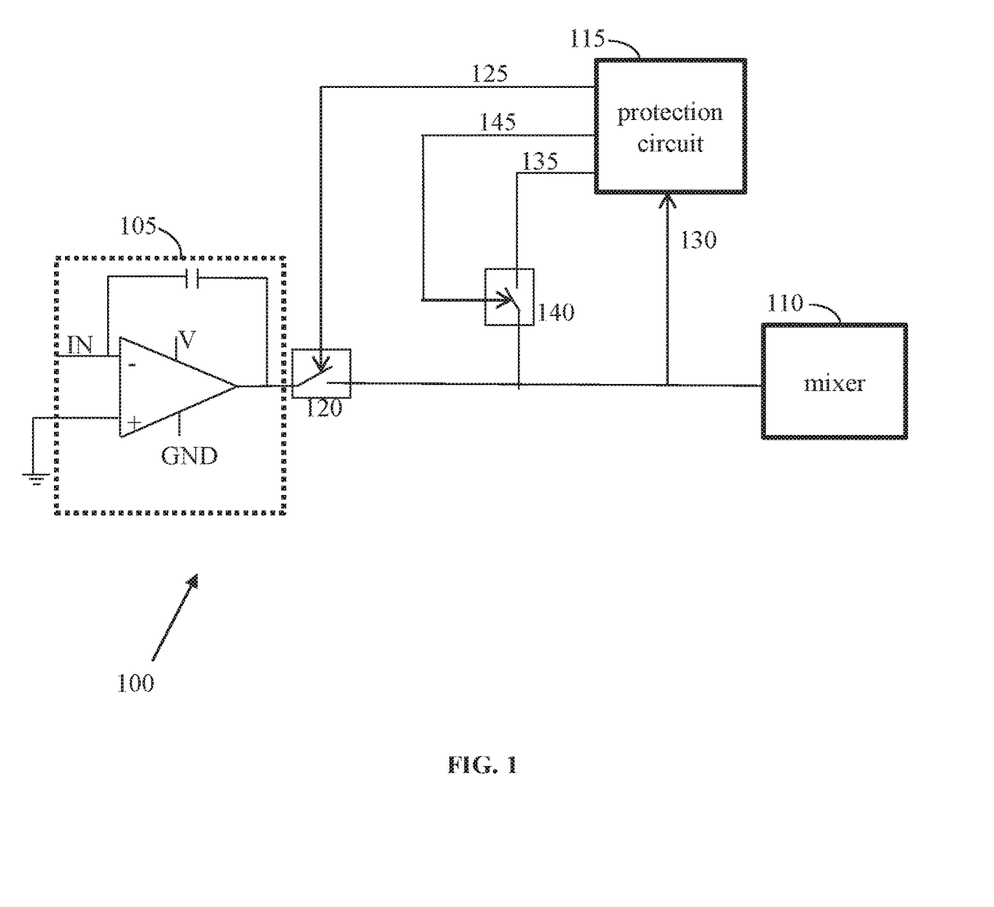
FIG. 1 illustrates a circuit for protecting a mixer, in accordance with one embodiment of the present disclosure.

FIG. 1 illustrates a circuit 100 for protecting a mixer, in accordance with one embodiment of the present disclosure. The circuit 100 comprises an input voltage driver block 105, a mixer 110 and a protection circuit 115. The input voltage driver block 105 refers to a block running on a power supply voltage higher than the maximum voltage rating of the mixer 110. In other words, the input voltage driver block 105 is a high voltage block. Further, the input voltage driver block 105 operates in baseband domain. In one example, the input voltage driver block 105 is an op-amp based integrating amplifier. Other examples of input voltage driver block include but not limited to power gain amplifiers, filters, analog buffers and DACs. The input voltage driver block 105 drives a low voltage block. The low voltage block runs at a voltage lower than the supply voltage of the input voltage driver block 105. Further, the low voltage block operates in Radio Frequency (RF) domain. In the present embodiment, the low voltage block is the mixer 110. The mixer 110 is one of a voltage mixer and a current-mode mixer. A voltage mode mixer may be one of a passive voltage mixer and an active voltage mixer. The current-mode mixer may be one of a passive current-mode mixer and an active current-mode mixer. Typically, a passive voltage mixer is driven by an analog buffer, configured as a source follower. Although the low voltage block presented in the current embodiment is a mixer 110, it should be understood that the low-voltage block may also represent a power amplifier, another buffer, filter etc.

As mentioned above, the input voltage driver block 105 is a high voltage block. In other words, the input voltage driver block 105 runs on a voltage V, higher than a maximum voltage rating of the mixer 110. For example, consider the input voltage driver block 105 runs on a 5V supply. The input voltage driver block 105 drives the mixer 110. The mixer 110 may withstand a maximum voltage, $V_{max}$. In other words, the mixer 110 may be damaged if a voltage higher than $V_{max}$ is given as input. If there are P type devices in the mixer, then they will get damaged if a voltage lower than a minimum voltage, $V_{min}$ is given as input. Further, voltage transients from the input voltage driver block 105 also result in the damage of the mixer 110. In order to protect the mixer 110, the voltage provided as input should be within a range of voltages allowable for driving the mixer. The range may be pre-defined or dynamically determined by the protection circuit 115. In this case, the range may be typically within the minimum voltage, $V_{min}$ and the maximum voltage, $V_{max}$. In order to ensure the voltage input to the mixer 110 stays within the range, the protection circuit 115 generates control signals to operate a plurality of switches. The plurality of switches alter the signal paths to maintain the voltage at the input of the mixer 110 within the range. In one example the switches are implemented using MOSFETs.

Referring to FIG. 1, the input voltage driver block 105 drives the mixer 110 through at least one first switch 120. The first switch 120 is present outside the input voltage driver block 105 and is operated by a control signal 125 provided by the protection circuit 115. The protection circuit 115 monitors the output of the input voltage driver block 105 continuously through a signal 130. The input of the mixer 110 may also be connected to a fixed reference voltage output 135 of the protection circuit 115. The fixed reference voltage output 135 is connected to the input of the mixer 110 through at least one second switch 140. The operation of the second switch 140 is controlled by the protection circuit 115 through a control signal 145. In other words, the protection circuit 115 operates the first switch 120 and the second switch 140 through the control signals 125 and 145, generated based on the output from the input voltage driver block 105.

The input voltage driver block 105 supplies an input voltage $V_{in}$ to the mixer 110 when the first switch 120 is closed and when the second switch 140 is open. For the above, voltage from the output of the input voltage driver block 105 is directly coupled to the mixer 110. The voltage provided as an input to the mixer 110 is continuously monitored by the protection circuit 115. The continuous monitoring of the voltage by the protection circuit 115 to control and protect the mixer 110 is explained in the following description.

Consider that the voltage output from the input voltage driver block 105 goes above a maximum voltage $V_{max}$. The protection circuit 115 detects an increase in the voltage by sensing the signal 130 at the input of the mixer 110. In response to sensing of increase in voltage, the protection circuit 115 generates control signals 125 and 145. The control signal 125 changes to 'LOW' state forcing the first switch 120 to be open. Further, the control signal 145 in 'HIGH' state forces the second switch 140 to be closed. Consequently, the path of the voltage from the input voltage driver block 105 is left open and the fixed reference voltage 135 is fed to the input of the mixer 110. In other words, the mixer 110 is disconnected from the input voltage driver block 105 and the fixed reference voltage output 135 of the protection circuit 115 is connected to the mixer 110.

Further, when the signal 130 reduces to a value within the range i.e., between minimum voltage $V_{min}$, and the maximum voltage $V_{max}$, the protection circuit 115 generates the control signal 125 in 'HIGH' state and the control signal 145 in 'LOW' state. In other words, the input voltage driver block 105 is connected back to the mixer 110, by closing the first switch 120 and by opening the second switch 140.

The same sequence of steps is followed, if the voltage output from the input voltage driver block 105 voltage falls below the minimum voltage $V_{min}$. In other words, the mixer 110 is disconnected from the input voltage driver block 105 and connected to the fixed reference voltage output 135 of the protection circuit 115. When the voltage returns to the range, i.e., within $V_{min}$ and $V_{max}$, the mixer 110 is connected back to the input voltage driver block 105.

Figure 2:
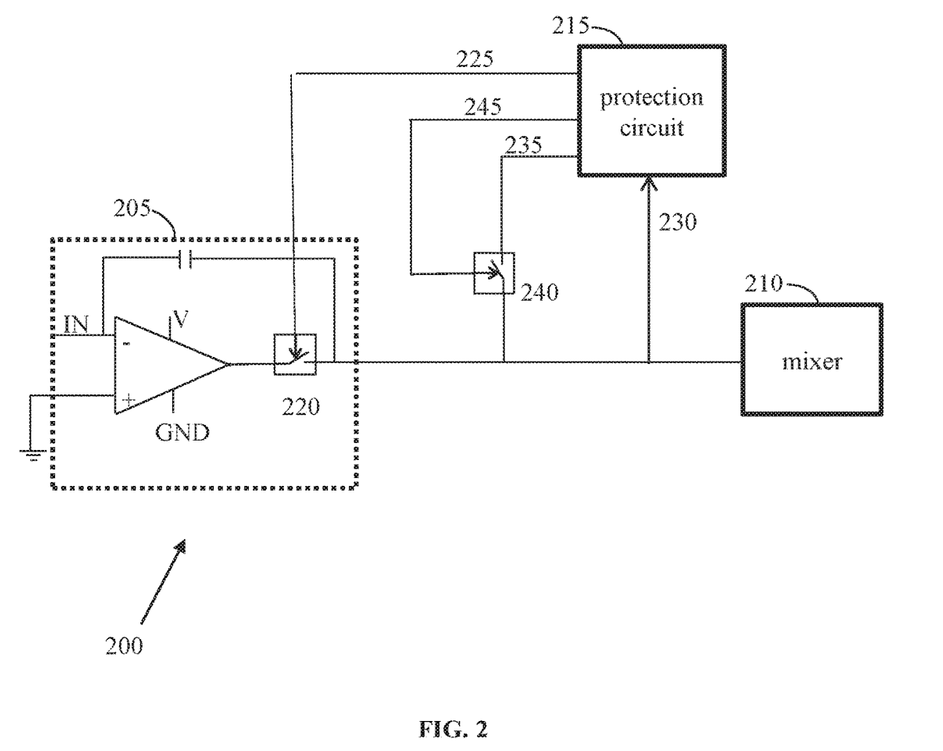
FIG. 2 illustrates a circuit for protecting a mixer, in accordance with another embodiment of the present disclosure.

FIG. 2 illustrates a circuit 200 for protecting a mixer in accordance with another embodiment of the present disclosure. The circuit 200 comprises an input voltage driver block 205, a mixer 210 and a protection circuit 215.

In the present embodiment, the input voltage driver block 205 is an op-amp based integrating amplifier. The input voltage driver block 205 drives the mixer 210 through a first switch 220. In the present embodiment, the first switch 220 is present in the feedback loop, inside the input voltage driver block 205. Consequently, the first switch 220 does not cause distortion. In case of a MOSFET switch, resistance of the switch varies with the gate-to-source voltage, $V_{GS}$. Therefore, any switch introduced in series with a signal path leads to harmonic distortion of the signal. By putting the switch inside the loop, the distortion caused by the switch is reduced by a factor equivalent to open loop gain Aβ. The first switch 220 is operated by a control signal 225 provided by the protection circuit 215. The protection circuit 215 monitors the output of the input voltage driver block 205 continuously through a signal 230. The input of the mixer 210 may also be connected to a fixed reference voltage output 235 of the protection circuit 215. The fixed reference voltage output 235 is connected to the input of the mixer 210 through a second switch 240. The protection circuit 215 controls the operation of the second switch 240 through a control signal 245. The operation of the second switch 240 is controlled by the protection circuit 215 through a control signal 245. The control of switches by the protection circuit 215 based on the voltage input to the mixer 210 is explained in detail using FIGS. 3 and 4.

Figure 3:
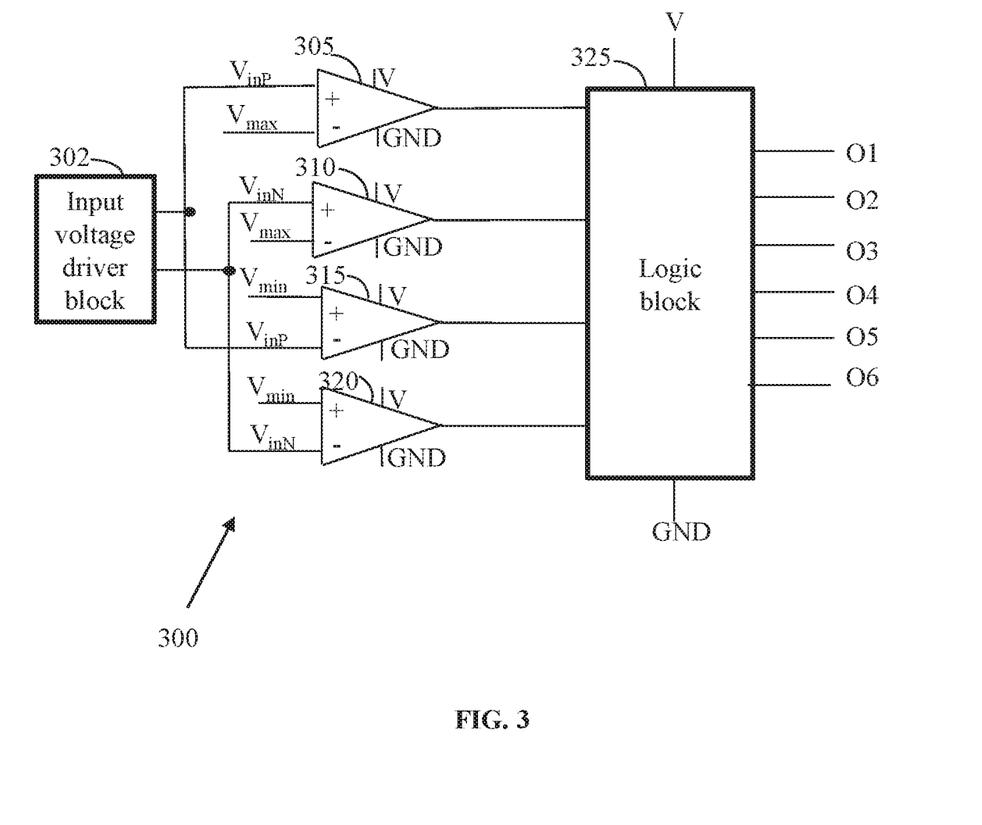
FIG. 3 illustrates a protection circuit, in accordance with one embodiment of the present disclosure.

FIG. 3 illustrates a protection circuit 300, in accordance with one embodiment of the present disclosure. $V_{max}$ is the maximum input voltage which may be provided to a mixer (not shown). Any voltage exceeding $V_{max}$ will damage the mixer. Further, $V_{min}$ is the minimum input voltage which may be provided to the mixer. Any voltage lower than $V_{min}$ will also damage the mixer. In the present embodiment, output from an input voltage driver block 302 is considered to be a differential voltage. The differential voltage consists of a positive voltage $V_{inP}$ and a negative voltage $V_{inN}$. The differential voltage from the input voltage driver block 302 is given as input to the mixer. The protection circuit 300 monitors the differential voltage supplied to the mixer by the input voltage driver block 302. The protection circuit comprises four voltage comparators 305, 310, 315, and 320 and a logic block 325. In the present embodiment, op-amps are used for implementing the voltage comparators. The voltage comparators 305, 310, 315, and 320 produce respective output by comparing the input voltage from an input voltage driver block 302 and a reference voltage.

At first, the voltage comparator 305 within the protection circuit compares the positive voltage, $V_{inP}$ with $V_{max}$. If $V_{inP}$ exceeds $V_{max}$, then a positive voltage is generated. Similarly, the voltage comparator 310 compares the negative voltage $V_{inN}$ with the maximum voltage $V_{max}$. If $V_{inN}$ exceeds $V_{max}$, then a positive voltage is generated. Similarly, the voltage comparators 315 and 320 compare the voltages $V_{inP}$ and $V_{inN}$ respectively with $V_{min}$. The output from the voltage comparators 305, 310, 315, and 320 are fed to the logic block 325. Further, the logic block generates outputs O1, O2, O3, O4, O5, and O6 based on the inputs from the voltage comparators 305, 310, 315, and 320. The outputs of the logic block O1, O2, O3, O4, O5, and O6 are provided to the control of switches (not shown).

Figure 4:
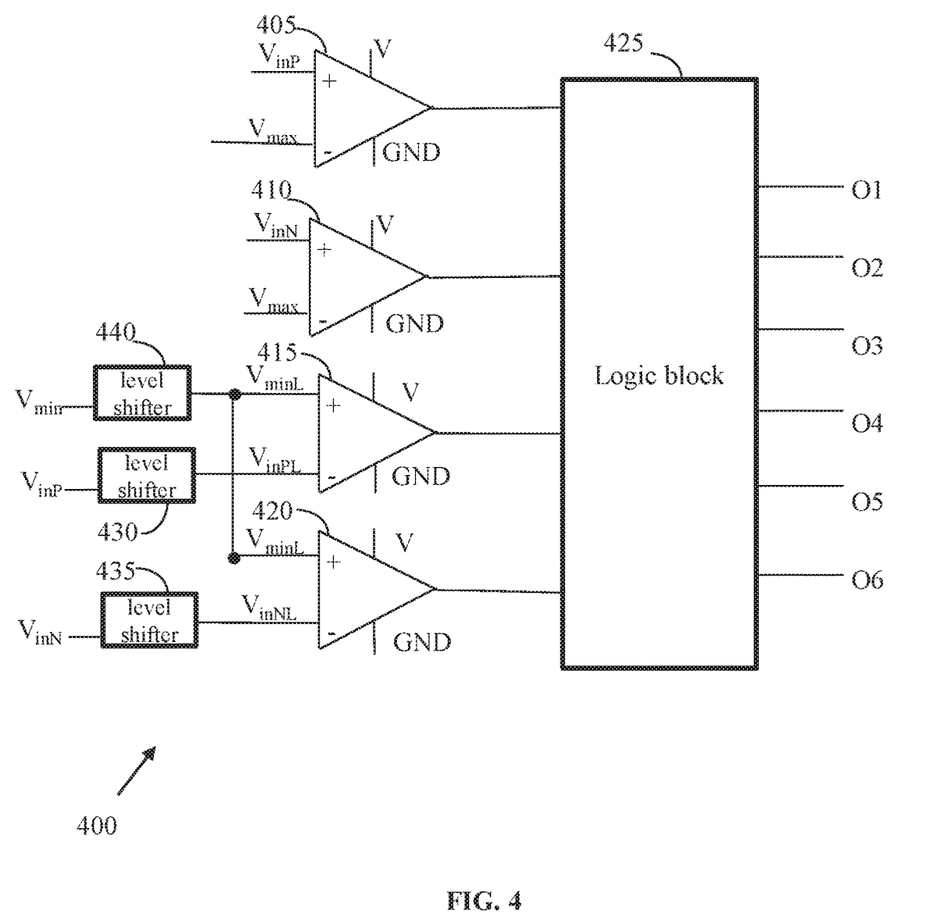
FIG. 4 illustrates a protection circuit, in accordance with another embodiment of the present disclosure.

FIG. 4 illustrates a protection circuit 400, in accordance with another embodiment of the present disclosure. $V_{max}$ is the maximum voltage value beyond which the devices in the mixer will be damaged. $V_{min}$ is the minimum input voltage below which the mixer will be damaged. The protection circuit 400 comprises four voltage comparators 405, 410, 415, and 420 and a logic block 425. The output of the input voltage driver block 402 is a differential voltage. The differential voltage consists of a positive voltage $V_{inP}$ and a negative voltage $V_{inN}$. The voltage comparators 405 and 410 compare the positive voltage $V_{inP}$ with $V_{max}$. Further, the output of the comparators 405 and 410 is sent to the input of the logic block 425.

The voltage comparators 415 and 420 compare the voltages $V_{inP}$ and $V_{inN}$ with the minimum voltage, $V_{min}$. However, in case of very low values of $V_{min}$, the voltage comparators 415 and 420 may require changes in their architecture. In order to use the same voltage comparator architecture as voltage comparators 405 and 410, level shifters 430, 435 and 440 are used before the voltage comparators 415 and 420, for level shifting $V_{min}$, $V_{inP}$ and $V_{inN}$ respectively. A level shifted minimum voltage $V_{inNL}$ is compared with a level shifted positive voltage $V_{inPL}$ at the voltage comparator 415. Similarly, the level shifted minimum voltage $V_{minL}$ is compared with a level shifted negative voltage $V_{inNL}$ at the voltage comparator 420. Further, the output of the comparators 415 and 420 is coupled to the input of logic block 425. The logic block 425 generates control signals O1, O2, O3, O4, O5, and O6. The control signals O1, O2, O3, O4, O5, and O6 are provided to the control of switches.

Figure 5:
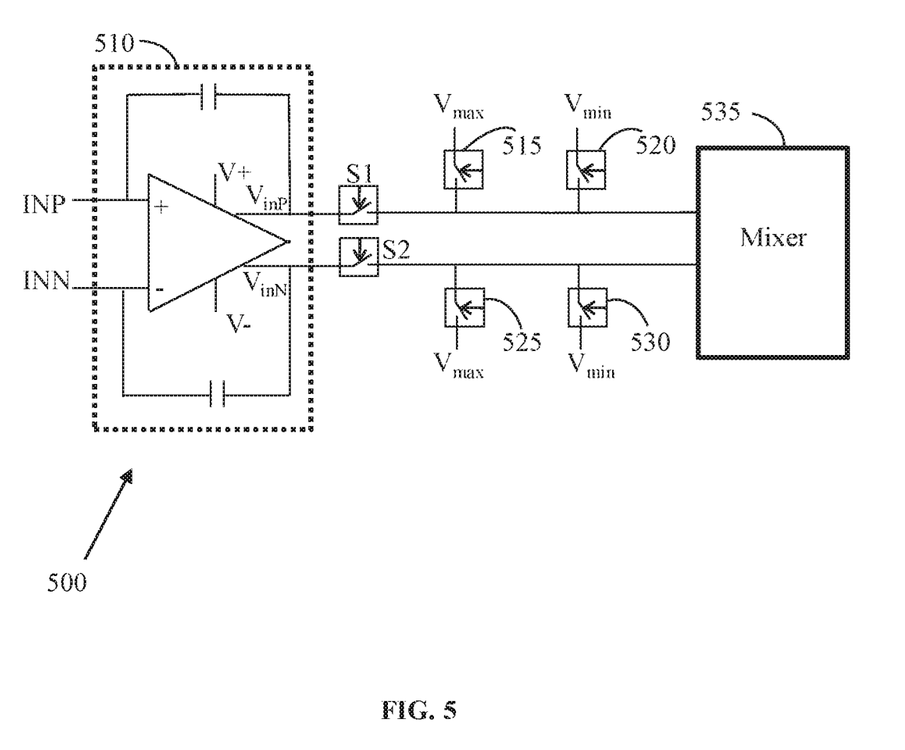
FIG. 5 illustrates configuration of a circuit for protecting low voltage devices in a mixer driven by a differential voltage, in accordance with one exemplary embodiment of the present disclosure.

FIG. 5 illustrates the configuration of a circuit 500 for protecting low voltage devices in a mixer when driven by a differential voltage, in accordance with one exemplary embodiment of the present disclosure. The circuit 500 comprises an input voltage driver block 510, a first set of switches S1 and S2, a second set of switches 515, 520, 525 and 530, and a mixer 535. The input voltage driver block 510 drives the mixer 535 through the first set of switches S1 and S2. In one example, the first set of switches S1 and S2 are presented outside the input voltage driver block 510. The differential input voltages $V_{inP}$ and $V_{inN}$ are provided across the mixer 535. The voltage provided across the mixer 535 is continuously monitored by a protection circuit (as shown in FIGS. 3 and 4). In one example, control voltages from a logic circuit within the protection circuit are given to the first and second set of switches S1, S2, 515, 520, 525 and 530. The control signals provided from the protection circuit as discussed in FIGS. 3 and 4 control the switches to maintain the input provided to the mixer 535 within a range, i.e., between minimum voltage $V_{min}$ and maximum voltage $V_{max}$.

In other words, the protection circuit operates the first set of switches S1, S2 and the second set of switches 515, 520, 525 and 530 when the output voltage is not within the range. Specifically, the protection circuit operates the first set of switches S1, S2 to feed voltage from input voltage driver block 510 to input of the mixer 535 (low voltage block). Further, the protection circuit operates the second set of switches 515, 520, 525 and 530 to feed a plurality of reference voltages to the input of the mixer 535 (low voltage block). In order to explain working of the protection circuit, an example may be used. Consider the voltage $V_{inP}$ goes above the maximum voltage $V_{max}$, while the voltage $V_{inN}$ remains within $V_{min}$ and $V_{max}$. The protection circuit detects the increase in the voltage $V_{inP}$. In order to maintain the input voltage to the mixer 535 within the range $V_{min}$ to $V_{max}$, the protection circuit generates appropriate control signals to operate the first and second set of switches S1, S2, 515, 520, 525 and 530. In this case, the control signals cause the first switch S1 and the second set of switches 520, 525 and 530 to be open and the first switch S2 and the second switch 515 to be closed. In other words, a reference voltage equal to $V_{max}$ is supplied in place of $V_{inP}$ to the mixer 535, when $V_{inP}$ exceeds $V_{max}$. The protection circuit continually monitors the voltages $V_{inP}$ and $V_{inN}$. When the voltage $V_{inP}$ comes back to a value with $V_{min}$ and $V_{max}$, the switch S1 is closed and the switch 515 is opened, to resume normal operation. Similarly, if the voltage $V_{inP}$ goes below the minimum voltage $V_{min}$ while the voltage $V_{inN}$ remains within $V_{min}$ and $V_{max}$, then the first switch S2 and the second switch 520 are closed, keeping the first switch S1 and the second set of switches 515, 525 and 530 open. In other words, a reference voltage equal to $V_{min}$ is supplied in place of $V_{inP}$ to the mixer 535, when $V_{inP}$ goes below $V_{min}$. A similar sequence of steps is performed if the voltage $V_{inN}$ goes out of the range $V_{min}$ to $V_{max}$.

In another embodiment, referring to FIG. 5, if $V_{inP}$ goes above the maximum voltage $V_{max}$, then the second set of switches 515 and 530 are closed and the remaining switches are opened, to provide $V_{max}$ and $V_{min}$ as differential input to the mixer 535. Similarly, if $V_{inN}$ goes below the minimum voltage $V_{min}$, then the second set of switches 515 and 530 are closed, to give a differential input of $V_{max}$ and $V_{min}$ to the mixer 535. If $V_{inP}$ goes below the minimum voltage $V_{min}$, then the second set of switches 520 and 525 are closed, to give a differential input of $V_{min}$ and $V_{max}$ to the mixer 535. Similarly, if $V_{inN}$ goes above the maximum voltage $V_{max}$, then the second set of switches 520 and 525 are closed to provide $V_{min}$ and $V_{max}$ as differential input to the mixer 535.

Figure 6:
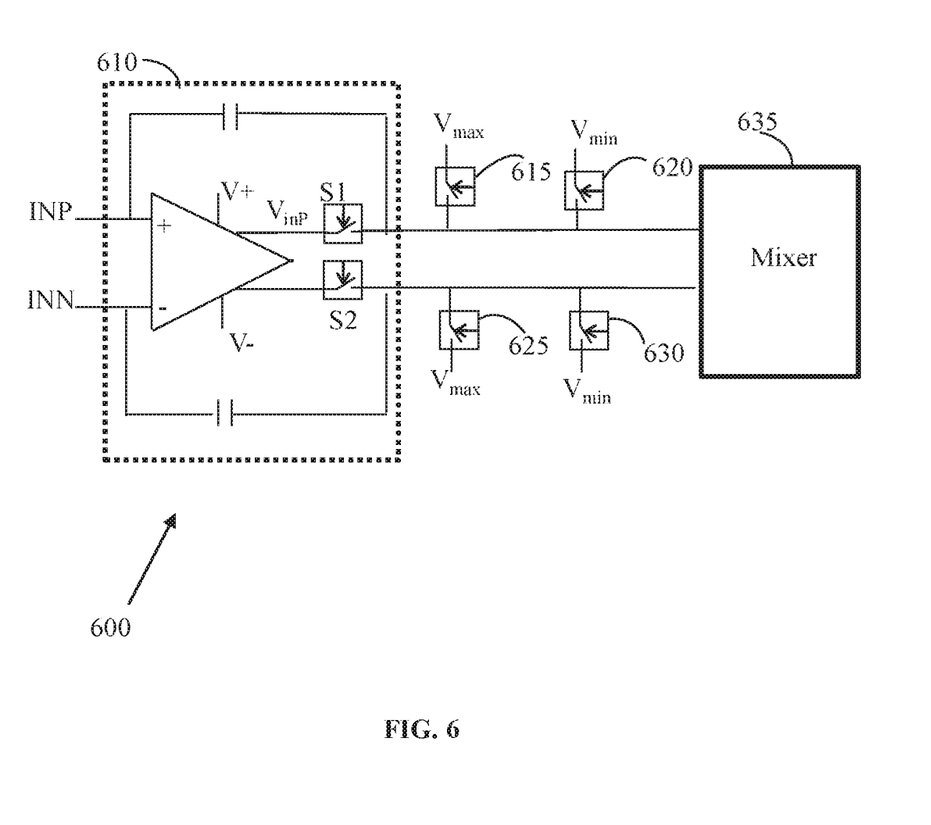
FIG. 6 illustrates configuration of a circuit for protecting low voltage devices in a mixer driven by a differential voltage, in accordance with another exemplary embodiment of the present disclosure.

FIG. 6 illustrates the configuration of the circuit 600 for protecting low voltage devices in a mixer when driven by a differential voltage, in accordance with another embodiment of the present disclosure. The circuit 600 comprises an input voltage driver block 610 and a mixer 635. The input voltage driver block 610 comprises a first set of switches S1 and S2. The circuit 600 further comprises a second set of switches 615, 620, 625 and 630. The presence of the a first set of switches S1 and S2 inside the input voltage driver block 610 avoids the possibility of harmonic distortion in the output of the mixer 635, as would occur if the switches were outside the input voltage driver block 610 (as in FIG. 5). The differential input voltage $V_{inP}$ and $V_{inN}$ are provided across a mixer 635. Control voltages from the protection circuit are given to the first and second set of switches S1, S2, 615, 620, 625 and 630.

Figure 7:
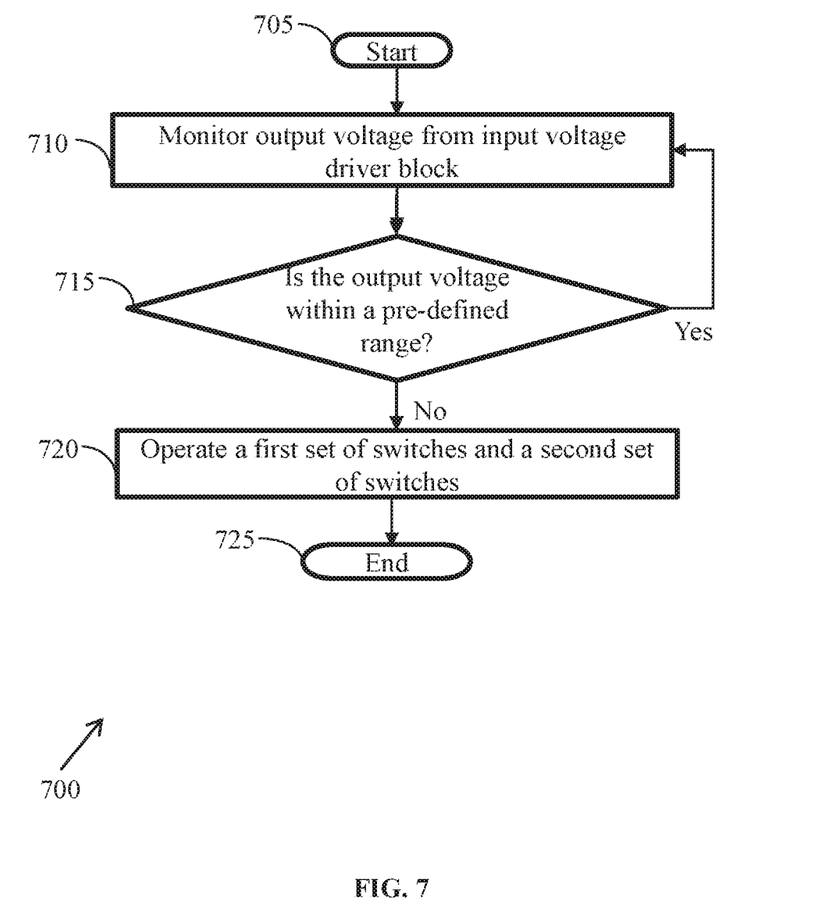
FIG. 7 is a flowchart of a method for protecting low voltage devices when driven by a high voltage block, in accordance with another embodiment of the present invention.

FIG. 7 is a flowchart of a method 700 for protecting a low voltage block driven by an input voltage driver block or a high voltage block, in accordance with one embodiment of the present disclosure. The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the disclosure described herein. Furthermore, the method may be implemented in any suitable hardware, software, and combination thereof.

The process begins at step 705.

At step 710, output voltage of the input voltage driver block is monitored.

At step 715, the output voltage is compared with a range of voltages allowable for driving the low voltage block. If the output voltage is within the range, then step 720 is performed. If the output voltage is outside the range, then step 725 is performed.

At step 720, a first set of switches are operated. The first set of switches are operated to feed voltage from the input voltage driver block to input of the low voltage block, At step 725, a second set of switches are operated to feed a plurality of reference voltages to the input of the low voltage block.

The process ends at step 730.

It is to be understood that the method 700 is a continuous process, whereby the output voltage of the input voltage driver block is monitored continuously (step 710) and a first set of switches (step 720) and the second set of switches (step 725) are operated depending upon the comparison of the output voltage with the range of voltages allowable for driving the low voltage block.

The various implementations of the protection circuit explained above is used to protect any low voltage device driven by a high voltage input. Further, the protection circuit may be used to ensure that the input voltage to the mixer is above a minimum voltage level. Furthermore, the protection circuit may be used in a bootstrap circuit to protect the circuit when the value of input voltage is not known.

In the preceding specification, the present disclosure and its advantages have been described with reference to the specific embodiments. However, it will be apparent to a person with ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

We claim:

1. A method of protecting low voltage devices driven by a high voltage block, the method comprising:
   monitoring an output voltage, from a high voltage block to a low voltage block;
   comparing the output voltage with a range of voltage allowable for driving the low voltage block; and
   operating a first set of switches and a second set of switches, wherein the first set of switches are operated when the output voltage is within the range to feed voltage from the high voltage block to input of the low voltage block, and wherein the second set of switches are operated when the output voltage is not within the range to feed a plurality of reference voltages to the input of the low voltage block.

2. The method of claim 1, wherein the low voltage block is operated in radio-frequency (RF) domain.

3. The method of claim 1, wherein the high voltage block is operated in baseband domain.

4. The method of claim 1, wherein the range allowable for driving the low voltage block is pre-defined.

5. The method of claim 1, wherein the range allowable for driving the low voltage block is dynamically determined.

6. A system for protecting low voltage devices driven by a high voltage block, the system comprising:
   a voltage comparator to:
      monitor an output voltage, from a high voltage block to a low voltage block; and
      compare the output voltage with a range of voltage allowable for driving the low voltage block; and
   a circuit to operate a first set of switches and a second set of switches, wherein the first set of switches are operated when the output voltage is within the range to feed voltage from the high voltage block to input of the low voltage block, and wherein the second set of switches are operated when the output voltage is not within the range to feed a plurality of reference voltages to the input of the low voltage block.

7. The system as claimed in claim 6, further comprises a logic block to generate control signals based on the output of the voltage comparator to operate the first set of switches and the second set of switches.

8. The system as claimed in claim 6, wherein the low voltage block is operated in radio-frequency (RF) domain.

9. The system as claimed in claim 6, wherein the high voltage block is operated in baseband domain.

10. The system as claimed in claim 6, wherein the range allowable for driving the low voltage block is pre-defined.

11. The system as claimed in claim 6, wherein the range allowable for driving the low voltage block is dynamically determined.

12. The system as claimed in claim 6, wherein the low voltage block is a mixer.

13. The system as claimed in claim 12, wherein the mixer is a voltage mixer.

14. The system as claimed in claim 12, wherein the mixer is a current-mode mixer.

15. The system as claimed in claim 12, wherein the mixer is a passive voltage mixer.

16. The system as claimed in claim 12, wherein the mixer is an active voltage mixer.

17. The system as claimed in claim 12, wherein the mixer is a passive current-mode mixer.

18. The system as claimed in claim 12, wherein the mixer is an active current-mode mixer.

* * * * *